(12) United States Patent
Chen et al.

(10) Patent No.: US 10,244,367 B2
(45) Date of Patent: Mar. 26, 2019

(54) SHORT MESSAGE IDENTIFICATION METHOD AND DEVICE, AND STORAGE MEDIUM

(71) Applicant: Beijing Xiaomi Mobile Software Co., Ltd., Beijing (CN)

(72) Inventors: Xinji Chen, Beijing (CN); Jiankai Zhao, Beijing (CN); Jin Tang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/938,511

(22) Filed: Mar. 28, 2018

(65) Prior Publication Data

US 2018/0288579 A1 Oct. 4, 2018

(30) Foreign Application Priority Data

Mar. 29, 2017 (CN) .......................... 2017 1 0199135

(51) Int. Cl.
*H04W 4/14* (2009.01)
*H04M 1/725* (2006.01)
*G06F 17/30* (2006.01)

(52) U.S. Cl.
CPC ........ *H04W 4/14* (2013.01); *G06F 17/30424* (2013.01); *G06F 17/30598* (2013.01);
(Continued)

(58) Field of Classification Search
CPC . H04L 63/0442; H04L 2209/56; H04L 51/28; H04L 9/004; H04L 9/088; H04L 63/061; H04L 2463/061; H04L 2463/102; H04L 41/0809; H04L 51/12; H04L 63/0227; H04L 67/14; H04L 9/0822; H04L 51/046; H04L 51/24; H04L 51/26; H04L 63/126; G06F 17/2235; G06F 3/0482; G06F 9/54; H04M 7/126; H04M 1/72566; H04W 12/04; H04W 4/14; G06Q 20/3574; G06Q 30/00; G06Q 30/0633; G06Q 50/24; H04N 2201/3212
See application file for complete search history.

(56) References Cited

U.S. PATENT DOCUMENTS 9,351,167 B1 * 5/2016 Adams .................. H04W 12/12
2002/0152220 A1 10/2002 Kang et al.
(Continued)

FOREIGN PATENT DOCUMENTS

EP  1 858 239 A1  11/2007
EP  2 020 643 A1  2/2009

OTHER PUBLICATIONS

Extended European Search Report dated Jun. 25, 2018 in European Patent Application No. 18164713.2, citing documents AA, AO, and AP therein, 11 pages.

*Primary Examiner* — Nizar N Sivji
(74) *Attorney, Agent, or Firm* — Oblon, McClelland, Maier & Neustadt, L.L.P.

(57) ABSTRACT

The present disclosure is related to a short message identification method and device, and a storage medium. The method includes receiving a short message via a terminal; extracting key information from the short message via a preset short message identification engine to identify the short message; and providing the key information to applications associated with the key information.

5 Claims, 11 Drawing Sheets

(52) U.S. Cl.
CPC .... *H04M 1/72552* (2013.01); *H04M 1/72522* (2013.01); *H04M 1/72597* (2013.01)

(56) References Cited

U.S. PATENT DOCUMENTS

| | | |
|---|---|---|
| 2010/0235759 A1 | 9/2010 | Kang et al. |
| 2011/0191380 A1* | 8/2011 | Karnam .............. G06Q 30/02 707/792 |
| 2011/0214083 A1 | 9/2011 | Kang et al. |
| 2016/0197993 A1* | 7/2016 | Perkowski .......... H04L 67/1097 709/203 |

* cited by examiner

SHORT MESSAGE IDENTIFICATION METHOD AND DEVICE, AND STORAGE MEDIUM

CROSS-REFERENCE TO RELATED APPLICATIONS

This application is based on and claims priority to Chinese Patent Application Serial No. 201710199135.9 filed on Mar. 29, 2017, the entire contents of which are incorporated herein by reference.

TECHNICAL FIELD

The present disclosure is related to the field of communication technology, and in particular to a short message identification method, a short message identification device, and a storage medium.

BACKGROUND

With the rapid development of mobile internet technology, more and more internet services involve communication between people. In the communication process, short messages are widely used due to their advantages of being short and concise, as well as due to the low cost of such messages. At present, most applications in mobile terminals require the system to give permission to read the short messages, and then complete various functions, such as recording a user's behavior by identifying content of the short messages. For example, a wallet application may identify billing short messages and credit card spending short messages to access/update a related account, and a calendar application may identify a user's travel ticket short message so as to record the user's trip in the calendar.

Such applications, however, use their own identification engines to identify short messages, respectively. Once a user receives a short message, these applications perform identification operations that consume and waste battery power.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for shot message identification. The method includes receiving a short message via a terminal; extracting key information from the short message via a preset short message identification engine to identify the short message; and providing the key information to applications associated with the key information.

In an example, when extracting the key information, the method includes classifying the short message to obtain a classification result corresponding to the short message, the classification result including a normal short message with key information to be extracted or an abnormal short message without key information to be extracted; and extracting the key information from the short message by identifying the short message when the classification result corresponding to the short message is the normal short message.

In another example, when providing the key information to the applications, the method includes receiving a query request from a first application of the applications in the terminal, the query request being configured to request key information of a specified type; and providing the key information of the specified type to the first application.

In yet another example, when providing the key information to the applications, the method includes broadcasting the key information to applications registered with a short message identification service.

In yet another example, when providing the key information to the applications, the method includes determining types of the key information; and based on associations between the types of the key information and the applications, sending the key information to the applications associated with the types of the key information.

According to an aspect, the method also includes obtaining at a preset moment short messages received by the terminal within a preset time period.

Aspects of the disclosure also provide a device for short message identification. The device includes a processor and a memory for storing instructions executable by the processor. The processor is configured to receive a short message via a terminal; extract key information from the short message via a preset short message identification engine to identify the short message; and provide the key information to applications associated with the key information.

Aspects of the disclosure also provide a non-transitory computer-readable storage medium having stored therein instructions that, when executed by a processor of a mobile terminal, cause the mobile terminal to perform a short message identification method. The method includes receiving a short message via a terminal; extracting key information from the short message via a preset short message identification engine to identify the short message; and providing the key information to applications associated with the key information.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise indicated. The implementations set forth in the following description of exemplary aspects do not represent all implementations consistent with the disclosure. Instead, they are merely examples of devices and methods consistent with aspects related to the disclosure as recited in the appended claims.

The current process for identifying short messages are that once a short message is received, various applications of the system require the system to give permission to read the short message, and use their own identification engines to identify content of the short message, respectively. Then, each application uses its own identification engine to identify the content of the short message once, and thus the power consumption of the system is large.

In order to solve the above problem, in one aspect, after obtaining a short message received by a terminal, key information in the short message can be obtained by using a preset short message identification engine to identify the short message, and then the key information is fed back to applications associated with the key information. Thus, the key information in the short message is identified only once by the preset short message identification engine, and then, various applications in the terminal, which require the identified key information and are associated with the identified key information, can use the identified key information, thereby preventing the various applications from identifying content of the short message, respectively, and thus reducing power consumption of the terminal.

Figure 1:
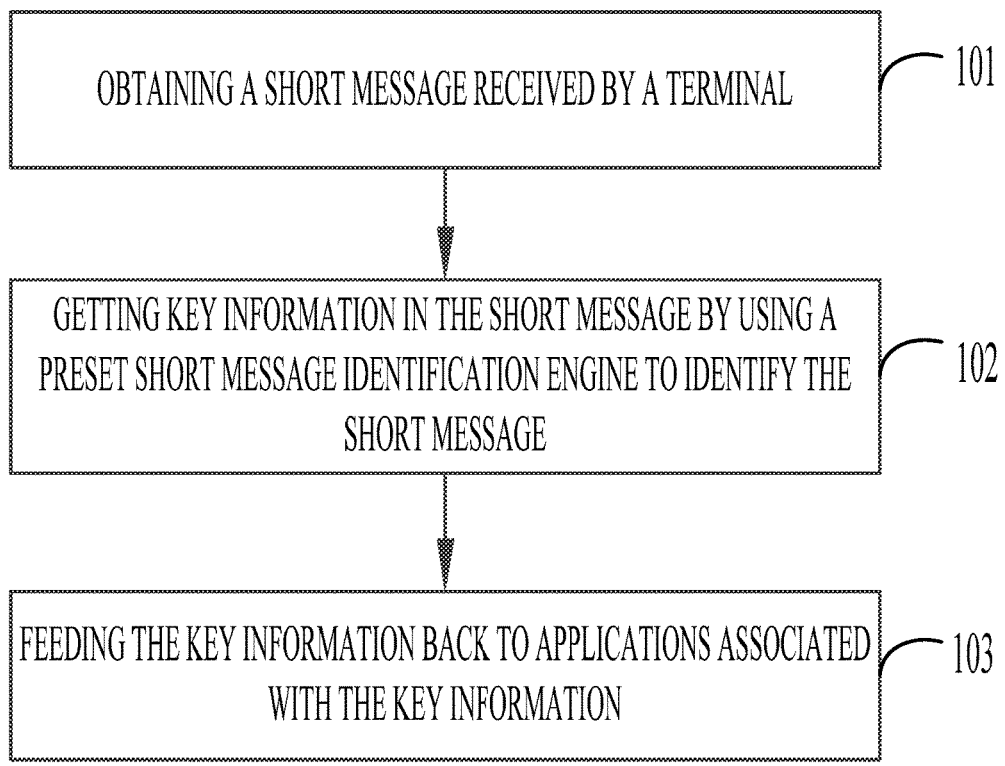
FIG. 1 is a flow chart showing a short message identification method according to an exemplary aspect of the present disclosure.

FIG. 1 is a flow chart showing a short message identification method according to an exemplary aspect. As shown in FIG. 1, the method is applied in an apparatus such as a terminal, and include the following steps 101 to 103.

Step 101 is to obtain a short message received by a terminal.

Step 102 is to get key information in the short message by using a preset short message identification engine to identify the short message.

Step 103 is to feed the key information back to applications associated with the key information.

In this aspect, the short message may also be called as short text message or short information, and is usually transmitted through the mobile communication network and thus may be referred as network short message or instant network message.

In this aspect, the preset short message identification engine of one aspect may be a short message identification engine preset by a terminal system, may also be a short message identification engine preset by a system application such as a short message application, and may also be a short message identification engine preset by a third-party application such as a security protection application. The method of this aspect may be implemented by an application or a system module which is provided in advance with the short message identification engine.

An example in which the method of this aspect is implemented by a short message application which is provided in advance with the short message identification engine, is described hereinafter.

In this aspect, after a short message is received by a terminal, the short message is sent to the short message application, and then the short message application can display content of this short message on a user interface of the short message application, so the short message application can directly obtain the short message received by the terminal. Then, the short message application can call the preset short message identification engine to analyze structures of content of the short message, thereby extracting corresponding key information from the content of the short message according to the structures of the content of the short message. Here, the key information refers to information that is needed to be obtained by an application installed in the terminal. Different applications require different key information. For example, key information required for an address book application includes names and phone numbers, key information required for a calendar application includes date information, and key information required for an accounting application includes billing information.

Here, the short message application may count types of key information required by applications which need to identify the short message, obtain predefined templates corresponding to these types of key information, match the content of the short message with the template for each type of key information, and extract corresponding key information according to an extraction rule of each matched template when the content of the short message matches with each matched template. When taken as the key information, one phone number is a continuous 7-digit, 8-digit or 11-digit number, a constitute form of content characteristics of a bank account is usually a continuous 16-19 digit number, a constitute form of content characteristics of a website is usually a string separated by "." and "/". Thus, according to the above characteristics, the short message identification engine may define a template as well as corresponding extraction rule for each type of key information. In this way, the short message identification engine can identify different key information in the short message according to the templates and the corresponding extraction rules.

As an example, the terminal receives a short message that "Dear XXX, your reservation for XXX Hotel, order No. XXXXXXXXX has been booked successfully, the amount spent is 2625RMB, check-in time is from Mar. 19, 2017 to Mar. 23, 2017, if you have any question, please directly reply this short message or call 029-XXXXXXXX (XX customer service)". The short message identification engine in the short message application can use the template for billing information to identify key information-event information: reservation for XXX Hotel, order No. XXXXXXXXX, the amount spent is 2625RMB, can use the template for date information to identify key information of date type: from Mar. 19, 2017 to Mar. 23, 2017, and can use the template for phone number to identify key information of phone number type: 029-XXXXXXXX and phone user name information XX customer service. After the terminal obtains the above key information, the key information can be fed back to the applications associated with the key information. For example, the calendar application for recording a user's schedule requires date information and event information, and thus an application associated with the date information and event information of the above key information is the calendar application; then the short message application in the terminal can feed back the key information of date type that is from Mar. 19, 2017 to Feb. 23, 2017 as well as the event information of reservation for XXX Hotel to the calendar application; and then the calendar application may schedule reminders for the user in advance, for example on Mar. 18, 2017, to remind the user to check in XXX hotel from Mar. 19, 2017 to Mar. 23, 2017. For another example, the accounting application for recording the user's bill requires amount spent and event information, then an application associated with the amount spent in the above key information is the accounting application, and the event information in the above key information can also be associated with the accounting application; then the short message application in the terminal can feed back "XXX hotel" and "the amount spent is 2625RMB" to the accounting application; and thus the accounting application can record that the user spends 2625RMB for the XXX hotel.

According to this aspect, the key information in the short message is identified only once and then the key information in the short message can be sent to various applications associated with the key information, thereby preventing the various applications from using the same technique as well as templates to identify the short message, respectively, and thus reducing power consumption of the terminal.

In one possible aspect, the step 102 of the above short message identification method may be implemented as the following steps A1 and A2.

The step A1 is to use the short message identification engine to classify the short message to obtain a classification result corresponding to the short message. The classification result includes a normal short message with key information to be extracted or an abnormal short message without key information to be extracted.

The step A2 is to, when the classification result corresponding to the short message is the normal short message, get key information in the short message by identifying the short message.

In this aspect, the key information required by the applications in the terminal is real information, and the applications in the terminal do not require false short messages such as fraudulent short messages, pseudo base station short messages, spam short messages, and thus there is no need to perform extraction of key information from the false short messages. Therefore, before the short message application identifies the key information in the short message, the short message application may first identify the classification of the short message so as to identify whether the received short message is the abnormal short message without key information to be extracted or the normal short message with key information to be extracted, thereby preventing the short message application from extracting key information from the abnormal short message.

In this aspect, the short message identification engine in the short message application is provided with a classifier. The classifier is provided with a classification model. The classification model is trained by learning massive samples of short messages. After the short message application receives the short message, the short messages is input into the classification model so that the classification model can output the classification result for the short message by extracting feature information of the short message and classification operation.

Here, for classifying the short message, the feature information extracted by the classifier of the short message identification engine includes multidimensional feature information, such as website information, phone number information, short message keywords which are used to determine whether the short message is a false short message; and may further include information such as base station identification information which is used to determine whether the short message is a pseudo base station short message.

Here, the process that the classifier of the short message identification engine classifies the short message may include: storing in the classifier a sender blacklist which stores base station identifiers of pseudo base stations, and extracting, by the short message identification engine, base station identification information of a sender of the short message. If the base station identification information of the sender of the short message is one of the sender blacklist, it indicates that the sender of the short message is a pseudo base station and the short message is a pseudo base station short message. If the base station identification information of the sender of the short message is not one of the sender blacklist, it indicates that the sender of the short message is not a pseudo base station and the short message is not a pseudo base station short message. Alternatively, the short message identification engine may store a sender whitelist which stores base station identifiers of regular base stations; when the short message identification engine extract base station identification information of a sender of the short message, if the base station identification information of the sender of the short message is one of the sender whitelist, it indicates that the sender of the short message is not a pseudo base station and the short message is not a pseudo base station short message; if the base station identification information of the sender of the short message is not one of the sender whitelist, it indicates that the sender of the short message is a pseudo base station and the short message is a pseudo base station short message.

Here, after determining that the short message is a pseudo base station short message, the short message identification engine outputs a classification result, and does not perform subsequent process. After determining that the short message is not a pseudo base station short message, the short message identification engine continues to extract feature information which is used to determine whether the short message is a false short message, and outputs a classification result after performing operation. The classification result is a probability value, which determines the short message as the normal short message if the probability that the short message is the normal short message is large, and determines the short message as the abnormal short message if the probability that the short message is the spam short message is large.

Here, after the classifier in the short message identification engine outputs the classification result, the short message application only needs to identify key information of the short message with the classification result being the normal short message, to obtain the key information of the normal short message. The short message application does not identify key information from the pseudo base station short message and the false short message.

It should be noted here that, identification of the key information of the normal short message may be performed in the above short message identification engine, or may be performed in another short message identification engine.

According to this aspect, after identifying the short message being the normal short message or the abnormal short message such as the pseudo base station short message and the false short message, identification of key information is not performed for the abnormal short message such as the pseudo base station short message and the false short message, and identification of key information is only performed for the normal short message, thereby reducing the number of identifying key information and then reducing power consumption of the terminal. Further, the terminal feeds back only the key information of the normal short message to various associated applications so that key information of the false short message and the pseudo base station short message are not obtained by other applications, thereby ensuring that the key information of the short message required by the various applications is true.

In one possible aspect, the step 103 of the above short message identification method may be implemented as the following steps B1 and B2.

The step B1 is to receive a query request from one application in the terminal. The query request is to request for key information of a specified type.

The step B2 is to feed back the key information of the specified type to the one application.

In this aspect, the application associated with the key information refers to one application which sends the query request for the key information. For example, the calendar application may send the query request to the short message application at regular intervals to request for information of date type. In this case, the short message application sends identified key information of date type to the calendar application.

In this aspect, the key information required by the application may not be sent to the application until the query request from the application is received, thereby further reducing power consumption of the terminal.

In one possible aspect, the step 103 of the above short message identification method may be implemented as the following step C1.

The step C1 is to broadcast the key information to applications registered with a short message identification service. The key information is provided for one application registered with the short message identification service to record required key information when the one application registered with the short message identification service determines required type of the key information.

In this aspect, the short message identification service is set in the terminal system. After an application is installed in the terminal, the application may register the short message identification service according to needs. After being allowed to register, the application can receive the key information broadcast by the short message application. After the short message application identifies that the short message is the normal short message and identifies the key information of the normal short message, it is not needed to send the corresponding key information until receiving the query request sent from one application, instead, identified various key information are broadcast in time to the applications registered with the short message identification service. After these applications receive the broadcast various key information, each of these applications only records the key information required by itself according to types of the key information and discards other key information.

This is also described with the above example in which the key information identified by the short message includes: the event information of reservation for XXX Hotel, order No. XXXXXXXXX, the amount spent is 2625RMB, the date information of from Mar. 19, 2017 to Mar. 23, 2017, phone number type information: 029-XXXXXXXX and phone user name information XX customer service. The short message application may broadcast the above key information to the calendar application, the accounting application and the address book application which are registered with the short message identification service. After the calendar application receives the above various key information, the calendar application records two types of information required by the calendar application: the event information of reservation for XXX Hotel and the date information of from Mar. 19, 2017 to Mar. 23, 2017, and discards other key information. After the accounting application receives the above various key information, the accounting application records three types of information required by the accounting application: the event information of reservation for XXX Hotel, order No. XXXXXXXXX and the amount spent is 2625RMB, and discards other key information. After the address book application receives the above various key information, the address book application records types of information required by the address book application: phone number type information: 029-XXXXXXXX and phone user name information XX customer service, and discards other key information.

According to this aspect, once the key information is identified, the key information is broadcast in time to the applications registered with the short message identification service, thereby ensuring that each of the applications registered with the short message identification service can determine and record in time the key information required for each of the applications registered with the short message identification service.

In one possible aspect, the step 103 of the above short message identification method may be implemented as the following steps D1 and D2.

The step D1 is to determine types of the key information.

The step D2 is to, according to pre-stored correspondence between types of key information and applications, send the key information to the applications corresponding to the types of the key information.

In this aspect, the short message application may pre-store correspondence between types of key information and applications. For example, the calendar application needs to record date information and event information, the accounting application requires billing information, and the address book application requires phone number information and phone number user name information, thus it may be pre-stored that the calendar application is corresponding to date information and event information, the accounting application is corresponding to billing information, and the address book application is corresponding to phone number information and phone number user name information. In this way, after the short message application identifies the key information, the short message application can determine types of various key information, and send date information and event information to the calendar application, send the billing information to the accounting application, and send the phone number information and phone number user name information to the address book application.

According to this aspect, after key information is identified, according to the type of each key information, each key information is sent to one application which requires this type of key information, thereby ensuring that the one application can record in time key information required by the one application and then reducing the power consumption of the terminal.

In one possible aspect, the above step 101 may be implemented as the following step E1.

The step E1 is to obtain at a preset moment short messages received by the terminal within a preset time period.

According to this aspect, the short message application may open a function to implement the method of this aspect only at the preset moment so as to obtain the short messages within the previous preset period and then perform steps 102 to 103, rather than running the function all the time so that the steps 101 to 103 are performed once one short message is received. As a result, it is not necessary to run the function all the time, thereby reducing the power consumption of the terminal. For example, the short message application may periodically obtain short messages received by the terminal within this period.

According to this aspect, short messages received by the terminal within a preset time period are obtained only at the preset moment, and then subsequent steps are performed, thereby reducing the power consumption of the terminal.

The implementation process is described in detail hereinafter with reference to several aspects.

Figure 2:
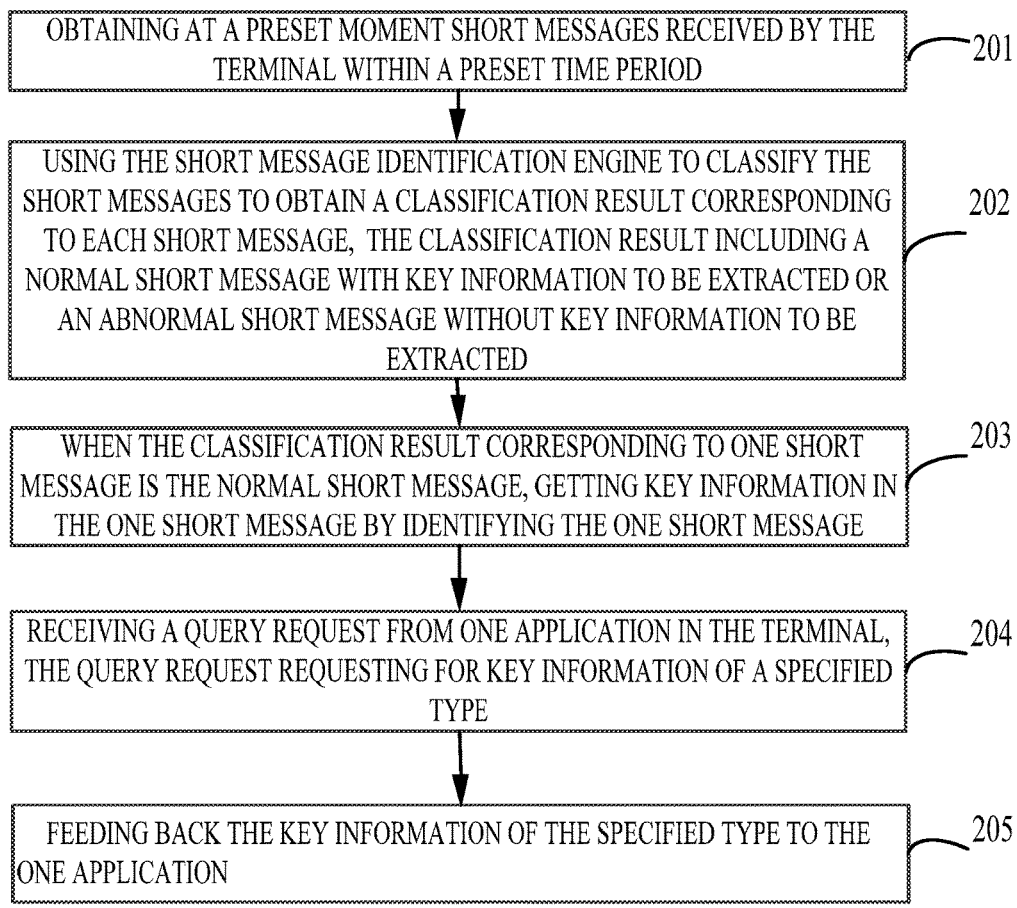
FIG. 2 is a flow chart showing a short message identification method according to an exemplary aspect of the present disclosure.

FIG. 2 is a flow chart showing a short message identification method according to an exemplary aspect. As shown in FIG. 2, the method may be implemented by terminals or other devices, and includes the following steps 201 to 205.

The step 201 is to obtain at a preset moment short messages received by the terminal within a preset time period.

The step 202 is to use the short message identification engine to classify the short messages to obtain a classification result corresponding to each short message. The classification result includes a normal short message with key information to be extracted or an abnormal short message without key information to be extracted.

The step 203 is to, when the classification result corresponding to one short message is the normal short message, get key information in the one short message by identifying the one short message.

The step 204 is to receive a query request from one application in the terminal. The query request is to request for key information of a specified type.

The step 205 is to feed back the key information of the specified type to the one application.

Figure 3:
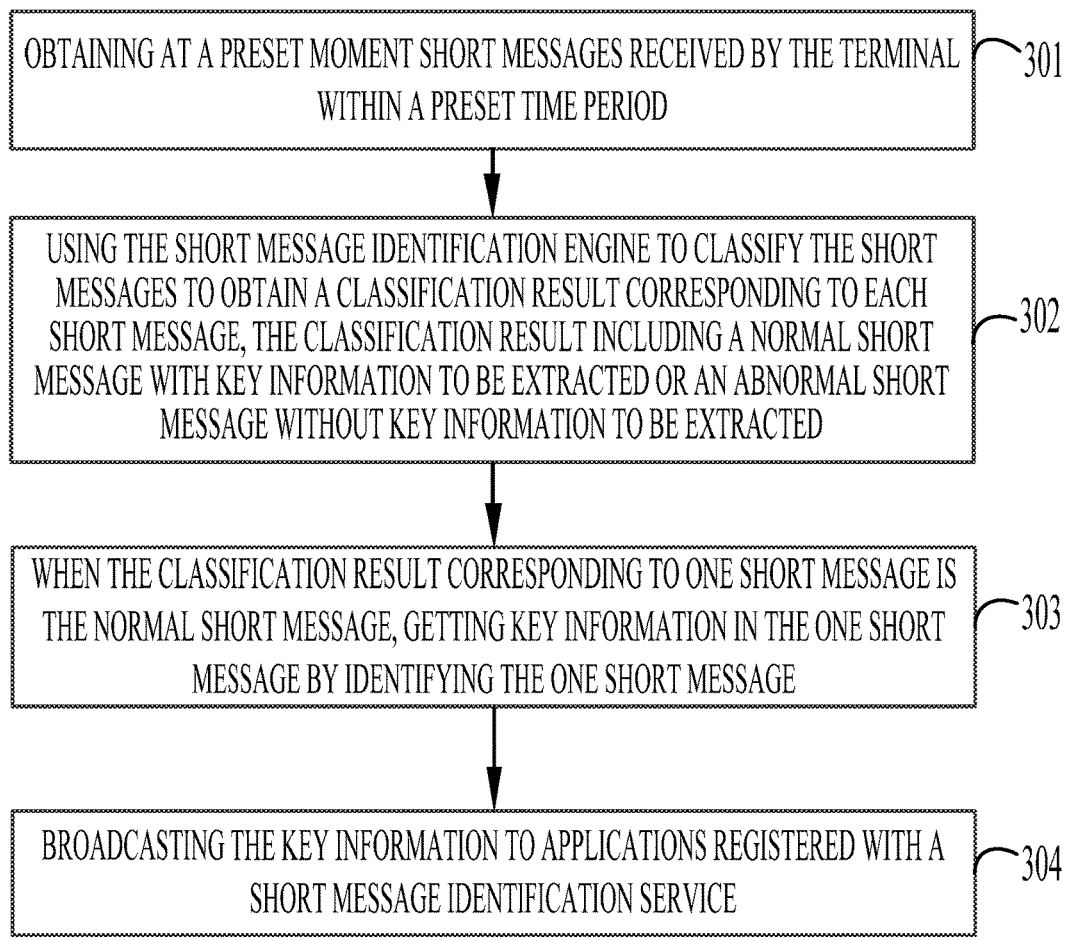
FIG. 3 is a flow chart showing a short message identification method according to an exemplary aspect of the present disclosure.

FIG. 3 is a flow chart showing a short message identification method according to an exemplary aspect. As shown in FIG. 3, the method may be implemented by terminals or other devices, and includes the following steps 301 to 304.

The step 301 is to obtain at a preset moment short messages received by the terminal within a preset time period.

The step 302 is to use the short message identification engine to classify the short messages to obtain a classification result corresponding to each short message. The classification result includes a normal short message with key information to be extracted or an abnormal short message without key information to be extracted.

The step 303 is to, when the classification result corresponding to one short message is the normal short message, get key information in the one short message by identifying the one short message.

The step 304 is to broadcast the key information to applications registered with a short message identification service.

Figure 4:
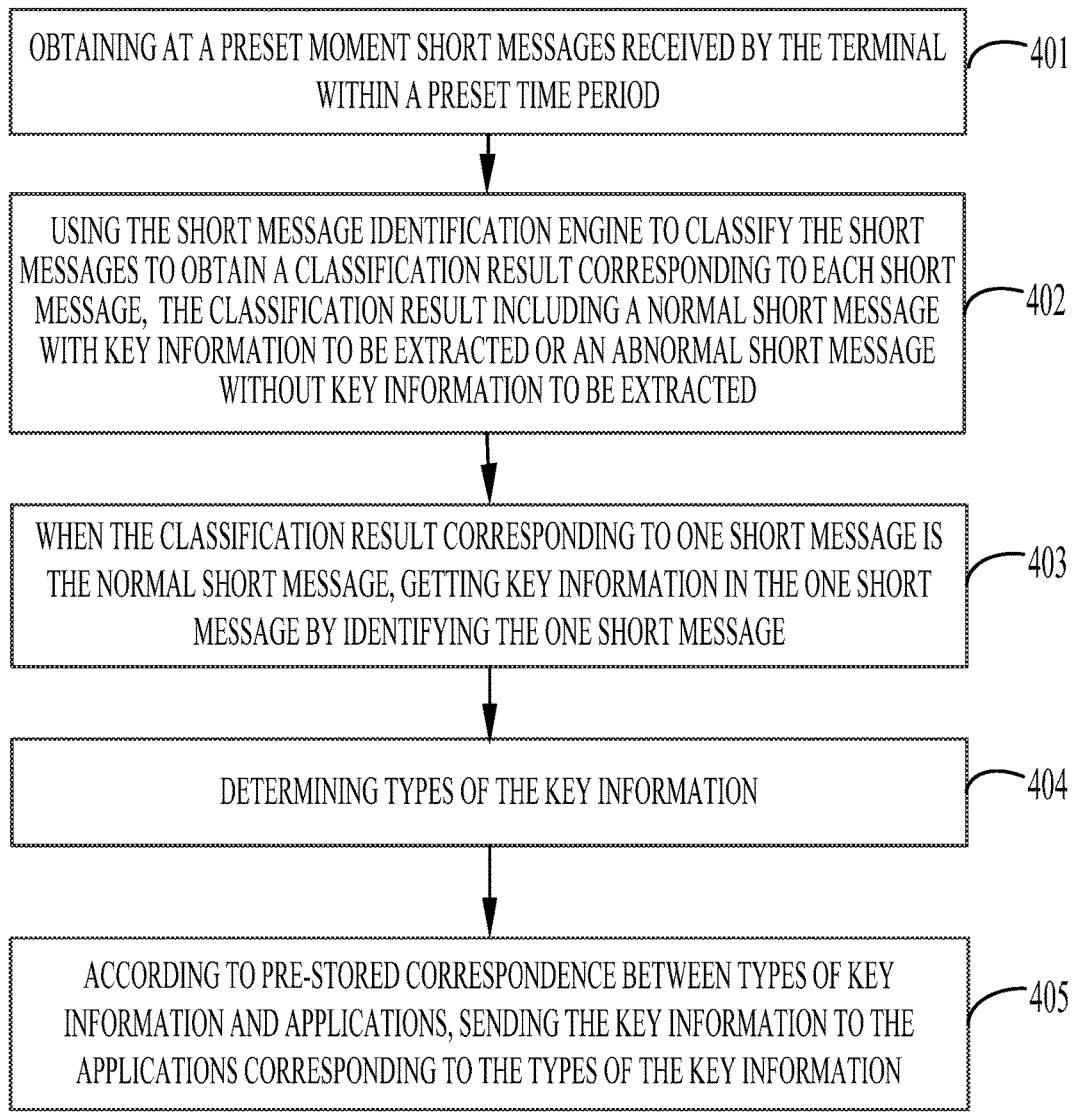
FIG. 4 is a flow chart showing a short message identification method according to an exemplary aspect of the present disclosure.

FIG. 4 is a flow chart showing a short message identification method according to an exemplary aspect. As shown in FIG. 4, the method may be implemented by terminals or other devices, and includes the following steps 401 to 405.

The step 401 is to obtain at a preset moment short messages received by the terminal within a preset time period.

The step 402 is to use the short message identification engine to classify the short messages to obtain a classification result corresponding to each short message. The classification result includes a normal short message with key information to be extracted or an abnormal short message without key information to be extracted.

The step 403 is to, when the classification result corresponding to one short message is the normal short message, get key information in the one short message by identifying the one short message.

The step 404 is to determine types of the key information.

The step 405 is to, according to pre-stored correspondence between types of key information and applications, send the key information to the applications corresponding to the types of the key information.

Device aspects of the present disclosure are described hereinafter, and can be used to implement the method aspects of the present disclosure.

Figure 5:
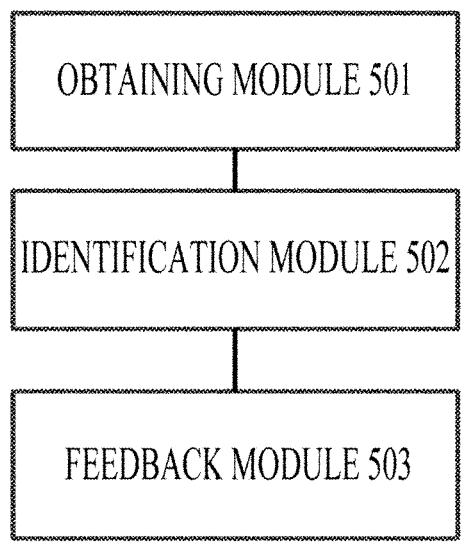
FIG. 5 is a block diagram illustrating a short message identification device according to an exemplary aspect of the present disclosure.

FIG. 5 is a block diagram illustrating a short message identification device according to an exemplary aspect. The device may be implemented as parts or all of an electronic device by software, hardware or a combination thereof. As shown in FIG. 5, the device includes an obtaining module 501, an identification module 502 and a feedback module 503.

The obtaining module 501 is to obtain a short message received by a terminal.

The identification module 502 is to get key information in the short message by using a preset short message identification engine to identify the short message.

The feedback module 503 is to feed the key information back to applications associated with the key information.

Figure 6:
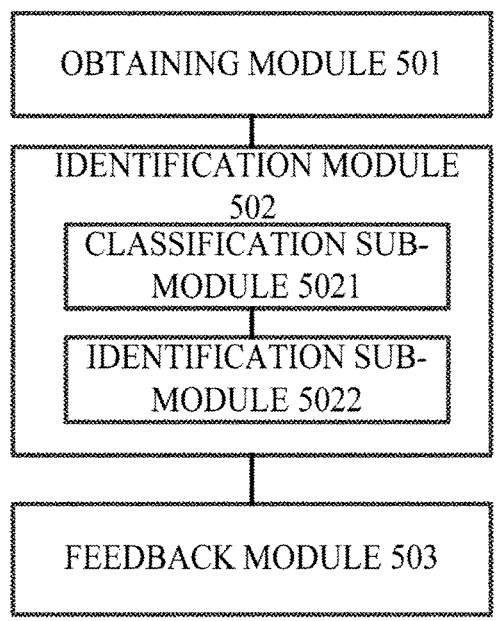
FIG. 6 is a block diagram illustrating a short message identification device according to an exemplary aspect of the present disclosure.

In one possible aspect, the above device may configure the identification module 502 to include a classification sub-module 5021 and an identification sub-module 5022, and FIG. 6 is a block diagram of the above device.

The classification sub-module 5021 is to use the short message identification engine to classify the short message to obtain a classification result corresponding to the short message. The classification result includes a normal short message with key information to be extracted or an abnormal short message without key information to be extracted.

The identification sub-module 5022 is to, when the classification result corresponding to the short message is the normal short message, get key information in the short message by identifying the short message.

Figure 7:
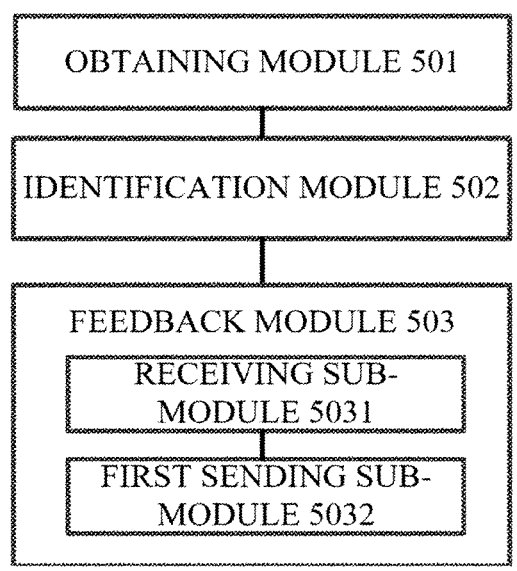
FIG. 7 is a block diagram illustrating a short message identification device according to an exemplary aspect of the present disclosure.

In one possible aspect, the above device may configure the feedback module 503 to include a receiving sub-module 5031 and a first sending sub-module 5032, and FIG. 7 is a block diagram of the above device.

The receiving sub-module 5031 is to receive a query request from one application in the terminal. The query request is to request for key information of a specified type.

The first sending sub-module 5032 is to feed back the key information of the specified type to the one application.

Figure 8:
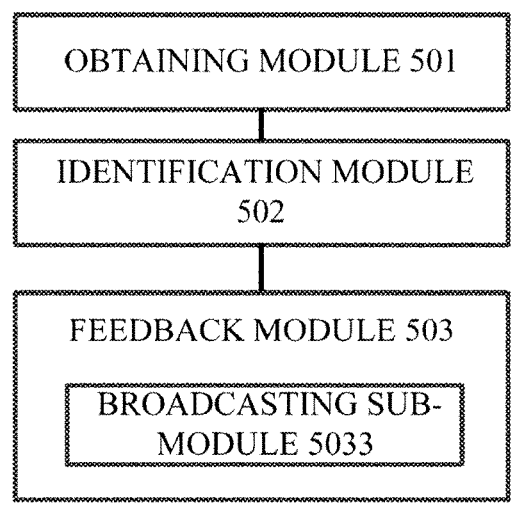
FIG. 8 is a block diagram illustrating a short message identification device according to an exemplary aspect of the present disclosure.

In one possible aspect, the above device may configure the feedback module 503 to include a broadcasting sub-module 5033, and FIG. 8 is a block diagram of the above device.

The broadcasting sub-module 5033 is to broadcast the key information to applications registered with a short message identification service.

Figure 9:
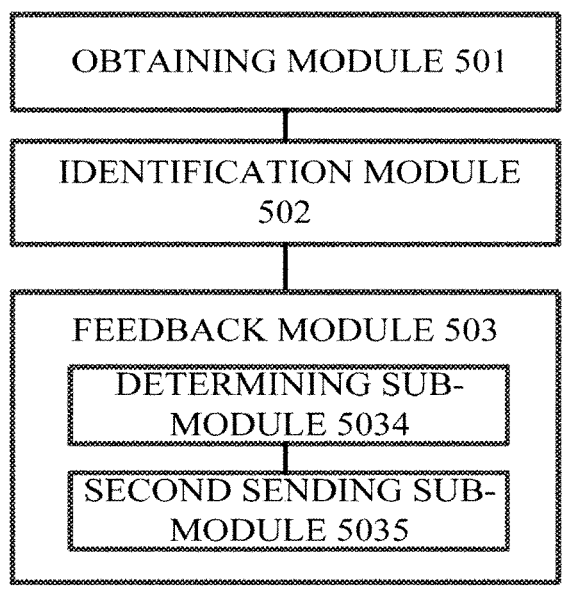
FIG. 9 is a block diagram illustrating a short message identification device according to an exemplary aspect of the present disclosure.

In one possible aspect, the above device may configure the feedback module 503 to include a determining sub-module 5034 and a second sending sub-module 5035, and FIG. 9 is a block diagram of the above device.

The determining sub-module 5034 is to determine types of the key information.

The second sending sub-module 5035 is to, according to pre-stored correspondence between types of key information and applications, send the key information to the applications corresponding to the types of the key information.

Figure 10:
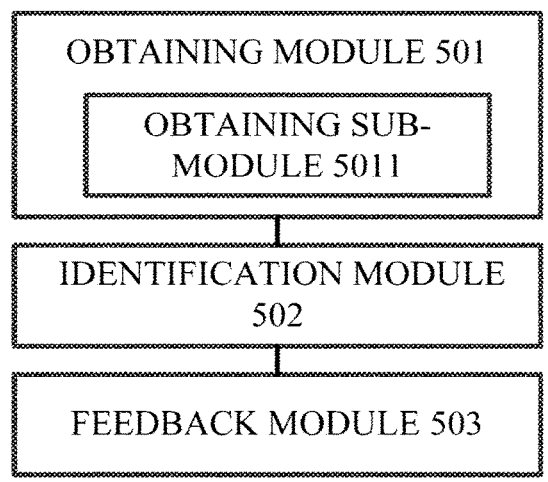
FIG. 10 is a block diagram illustrating a short message identification device according to an exemplary aspect of the present disclosure.

In one possible aspect, the above device may configure the obtaining module 501 to include an obtaining sub-module 5011, and FIG. 10 is a block diagram of the above device.

The obtaining sub-module 5011 is to obtain at a preset moment short messages received by the terminal within a preset time period.

With respect to the device in the above aspects, the specific manners for performing operations in individual modules therein have been described in detail in the aspects regarding the related methods and will not be elaborated herein.

Figure 11:
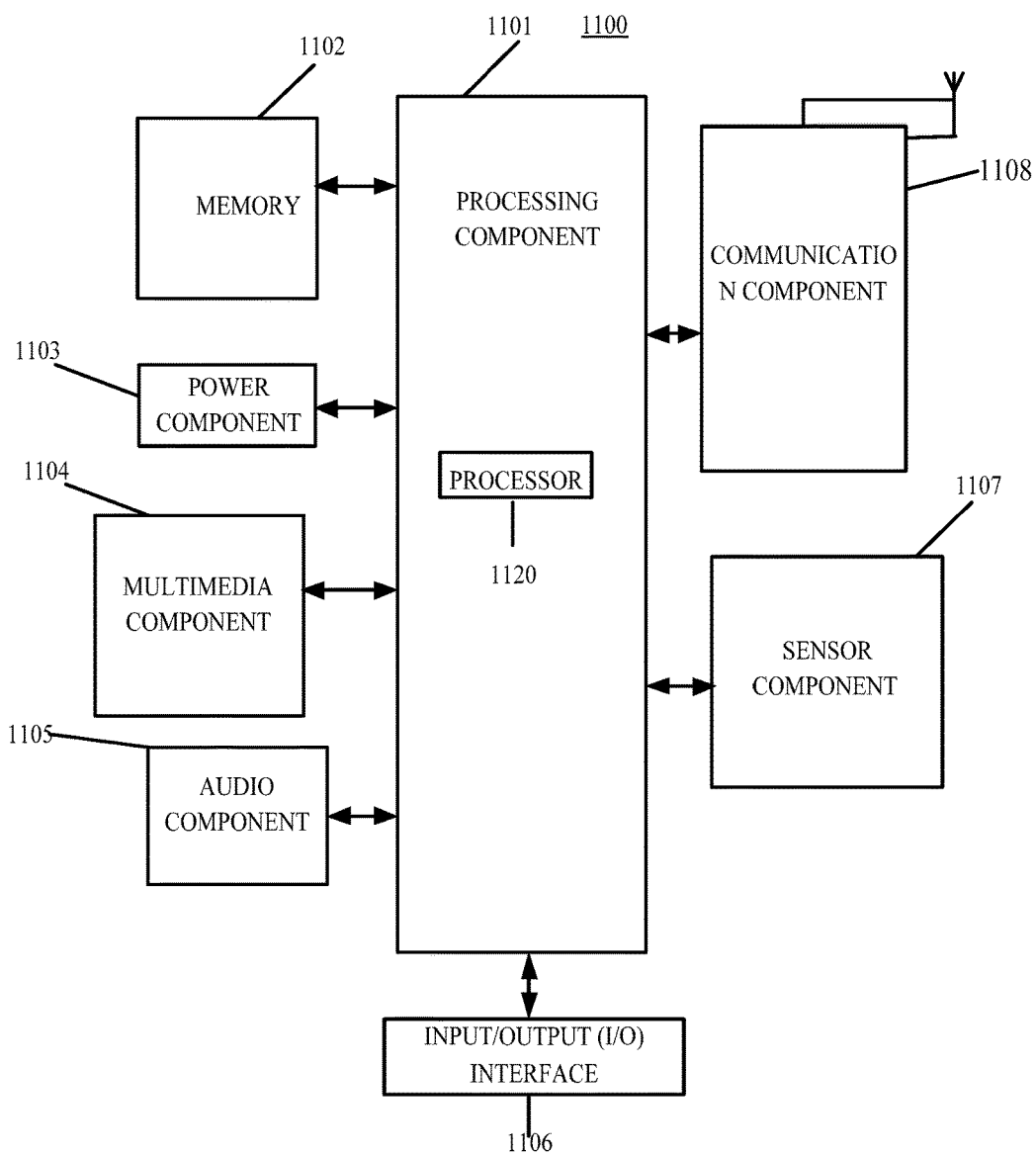
FIG. 11 is a block diagram illustrating a short message identification device according to an exemplary aspect of the present disclosure.

FIG. 11 is a block diagram illustrating a short message identification device according to an exemplary aspect. The device is applicable to a terminal device. For example, the device 1100 may be a mobile phone, a gaming console, a computer, a tablet device, a personal digital assistant or the like.

The device 1100 may include one or more of the following components: a processing component 1101, a memory 1102, a power component 1103, a multimedia component 1104, an audio component 1105, an input/output (I/O) interface 1106, a sensor component 1107 and a communication component 1108.

The processing component 1101 typically controls overall operations of the device 1100, such as the operations associated with display, phone calls, data communications, camera operations and recording operations. The processing component 1101 may include one or more processors 1120 to execute instructions to perform all or part of the steps in the above described methods. Moreover, the processing component 1101 may include one or more modules which facilitate the interaction between the processing component 1101 and other components. For example, the processing component 1101 may include a multimedia module to facilitate the interaction between the multimedia component 1104 and the processing component 1101.

The memory 1102 is configured to store various types of data to support operations of the device 1100. Examples of such data include instructions for any applications or methods operated on the device 1100, contact data, phonebook data, messages, pictures, video, etc. The memory 1102 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1103 provides power to various components of the device 1100. The power component 1103 may include a power supply management system, one or more power sources, and any other components associated with the generation, management, and distribution of power in the device 1100.

The multimedia component 1104 includes a screen providing an output interface between the device 1100 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some aspects, the multimedia component 1104 includes a front camera and/or a rear camera. The front camera and/or the rear camera may receive an external multimedia datum while the device 1100 is in an operation mode, such as a photographing mode or a video mode. Each of the front camera and the rear camera may be a fixed optical lens system or have focus and optical zoom capability.

The audio component 1105 is configured to output and/or input audio signals. For example, the audio component 1105 includes a microphone (MIC) configured to receive an external audio signal when the device 1100 is in an operation mode, such as a call mode, a recording mode, and a voice recognition mode. The received audio signal may be further stored in the memory 1102 or transmitted via the communication component 1108. In some aspects, the audio component 1105 further includes a speaker to output audio signals.

The I/O interface 1106 provides an interface between the processing component 1101 and peripheral interface modules, such as a keyboard, a click wheel, buttons, and the like. The buttons may include, but are not limited to, a home button, a volume button, a starting button, and a locking button.

The sensor component 1107 includes one or more sensors to provide status assessments of various aspects of the device 1100. For instance, the sensor component 1107 may detect an open/closed status of the device 1100, relative positioning of components, e.g., the display and the keypad, of the device 1100, a change in position of the device 1100 or a component of the device 1100, a presence or absence of user's contact with the device 1100, an orientation or an acceleration/deceleration of the device 1100, and a change in temperature of the device 1100. The sensor component 1107 may include a proximity sensor configured to detect the presence of nearby objects without any physical contact. The sensor component 1107 may also include a light sensor, such as a CMOS or CCD image sensor, for use in imaging applications. In some aspects, the sensor component 1107 may also include an accelerometer sensor, a gyroscope sensor, a magnetic sensor, a pressure sensor or a temperature sensor.

The communication component 1108 is configured to facilitate communication, wired or wirelessly, between the device 1100 and other devices. The device 1100 can access a wireless network based on a communication standard, such as WiFi, 2G, or 3G, or a combination thereof. In one exemplary aspect, the communication component 1108 receives a broadcast signal or broadcast associated information from an external broadcast management system via a broadcast channel. In one exemplary aspect, the communication component 1108 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary aspect, there is also provided a non-transitory computer-readable storage medium including instructions, such as included in the memory 1102, executable by the processor 1120 in the device 1100, for performing the above-described methods. For example, the non-transitory computer-readable storage medium may be a ROM, a RAM, a CD-ROM, a magnetic tape, a floppy disc, an optical data storage device, and the like.

The non-transitory computer-readable storage medium having stored therein instructions that, when executed by a processor of the device 1100, causes the device 1100 to perform the above short message identification method. The method includes:

obtaining a short message received by a terminal, getting key information in the short message by using a preset short message identification engine to identify the short message, feeding the key information back to applications associated with the key information.

The instructions stored in the storage medium may further cause the device to get key information in the short message by using a preset short message identification engine to identify the short message in such a manner which includes:

using the short message identification engine to classify the short message to obtain a classification result corresponding to the short message, the classification result including a normal short message with key information to be extracted or an abnormal short message without key information to be extracted, getting key information in the short message by identifying the short message when the classification result corresponding to the short message is the normal short message.

The instructions stored in the storage medium may further cause the device to feed the key information back to applications associated with the key information in such a manner which includes:

receiving a query request from one application in the terminal, the query request being configured to request for key information of a specified type;

feeding back the key information of the specified type to the one application.

The instructions stored in the storage medium may further cause the device to feed the key information back to applications associated with the key information in such a manner which includes:

broadcasting the key information to applications registered with a short message identification service.

The instructions stored in the storage medium may further cause the device to feed the key information back to applications associated with the key information in such a manner which includes:

determining types of the key information;

according to pre-stored correspondence between types of key information and applications, sending the key information to the applications corresponding to the types of the key information.

The instructions stored in the storage medium may further cause the device to obtain a short message received by a terminal in such a manner which includes:

obtaining at a preset moment short messages received by the terminal within a preset time period.

A short message identification device includes:

a processor, a memory for storing instructions executable by the processor;

wherein the processor is configured to, obtain a short message received by a terminal, get key information in the short message by using a preset short message identification engine to identify the short message, feed the key information back to applications associated with the key information.

The processor is further configured to get key information in the short message by using a preset short message identification engine to identify the short message in such a manner which includes:

using the short message identification engine to classify the short message to obtain a classification result corresponding to the short message, the classification result including a normal short message with key information to be extracted or an abnormal short message without key information to be extracted, getting key information in the short message by identifying the short message when the classification result corresponding to the short message is the normal short message.

The processor is further configured to feed the key information back to applications associated with the key information in such a manner which includes:

receiving a query request from one application in the terminal, the query request being configured to request for key information of a specified type;

feeding back the key information of the specified type to the one application.

The processor is further configured to feed the key information back to applications associated with the key information in such a manner which includes:

broadcasting the key information to applications registered with a short message identification service.

The processor is further configured to feed the key information back to applications associated with the key information in such a manner which includes:

determining types of the key information;

according to pre-stored correspondence between types of key information and applications, sending the key information to the applications corresponding to the types of the key information.

The processor is further configured to obtain a short message received by a terminal in such a manner which includes:

obtaining at a preset moment short messages received by the terminal within a preset time period.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for short message identification, the method comprising:
   receiving a short message via a terminal;
   extracting key information from the short message via a preset short message identification engine to identify the short message, wherein extracting the key information comprises:
      classifying the short message to obtain a classification result corresponding to the short message, the classification result including a normal short message with key information to be extracted or an abnormal short message without key information to be extracted; and
      extracting the key information from the short message by identifying the short message when the classification result corresponding to the short message is the normal short message; and
   providing the key information to applications associated with the key information, wherein providing the key information to the applications comprises:
      determining types of the key information; and
      based on associations between the types of the key information and the applications, sending the key information to the applications associated with the types of the key information.

2. The method of claim 1, further comprising:
   obtaining at a preset moment short messages received by the terminal within a preset time period.

3. A device for short message identification, comprising:
   a processor;
   a memory for storing instructions executable by the processor,
   wherein the processor is configured to:
      receive a short message via a terminal;
      extract key information from the short message via a preset short message identification engine to identify the short message, wherein when extracting the key information, the processor is further configured to:
         classify the short message to obtain a classification result corresponding to the short message, the classification result including a normal short message with key information to be extracted or an abnormal short message without key information to be extracted; and
         extract the key information from the short message by identifying the short message when the classification result corresponding to the short message is the normal short message; and
      provide the key information to applications associated with the key information, wherein when providing the key information to the applications, the processor is further configured to:
         determine types of the key information; and
         based on associations between the types of the key information and the applications, send the key information to the applications associated with the types of the key information.

4. The device of claim 3, wherein the processor is further configured to:
   obtain at a preset moment short messages received by the terminal within a preset time period.

5. A non-transitory computer-readable storage medium having stored therein instructions that, when executed by a processor of a mobile terminal, cause the mobile terminal to perform a method for short message identification, the method comprising:
   receiving a short message via a terminal;
   extracting key information from the short message via a preset short message identification engine to identify the short message, wherein extracting the key information comprises:
      classifying the short message to obtain a classification result corresponding to the short message, the classification result including a normal short message with key information to be extracted or an abnormal short message without key information to be extracted; and
      extracting the key information from the short message by identifying the short message when the classification result corresponding to the short message is the normal short message; and
   providing the key information to applications associated with the key information; wherein providing the key information to the applications comprises:
      determining types of the key information; and
      based on associations between the types of the key information and the applications, sending the key information to the applications associated with the types of the key information.

* * * * *